US008701421B2

(12) United States Patent  
Glasgow et al.

(10) Patent No.: US 8,701,421 B2  
(45) Date of Patent: *Apr. 22, 2014

(54) DYNAMIC COMBUSTION CHAMBER

(75) Inventors: Carl W. Glasgow, Costa Mesa, CA (US); Robert C. Olson, Modesto, CA (US); Edward J. Stockton, Stockton, CA (US)

(73) Assignee: SOG Partners, Modesto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/282,287

(22) Filed: Oct. 26, 2011

(65) Prior Publication Data

US 2012/0043765 A1   Feb. 23, 2012

Related U.S. Application Data

(63) Continuation of application No. 12/422,537, filed on Apr. 13, 2009, now abandoned, which is a continuation of application No. 11/385,590, filed on Mar. 21, 2006, now Pat. No. 7,546,732.

(51) Int. Cl.  
*F01K 23/02* (2006.01)  
*F02C 5/00* (2006.01)  
*F01K 7/34* (2006.01)

(52) U.S. Cl.  
USPC .................. 60/775; 60/39.6; 60/653; 60/679

(58) Field of Classification Search  
USPC ............................ 60/775, 653, 677–679, 39.6  
See application file for complete search history.

(56) References Cited

U.S. PATENT DOCUMENTS 2,890,166 A    6/1959   Heinze  
4,063,414 A   12/1977   Sata et al.  
(Continued)

FOREIGN PATENT DOCUMENTS

FR    637649    2/1928  
FR    637649    5/1928  
GB    160517    3/1921

OTHER PUBLICATIONS

Cecil, "On the Application of Hydrogen Gas to Produce a Moving Power in Machinery; with a Description of an Engine which is moved by the Pressure of the Atmosphere upon a Vacuum Caused by Explosions of Hydrogen Gas and Atmospheric Air," Fellow of Magdalen College and of the Cambridge Philosophical Society, 1820.

(Continued)

*Primary Examiner* — Hoang Nguyen  
(74) *Attorney, Agent, or Firm* — Knobbe, Martens, Olson & Bear, LLP

(57) ABSTRACT

A system for converting potential energy into heat including a tower configured to contain a fluid and to permit the formation of a substantially nitrogen-free combustion chamber defined by the tower and the surface of the fluid in the tower and at a pressure less than ambient, a first tower outlet in fluid communication with a first fuel valve configured to regulate a flow of the fluid out of the tower, an oxygen source in fluid communication with an oxygen valve in fluid communication with an oxygen inlet in fluid communication with the tower, a source of combustible fuel including hydrogen in fluid communication with a fuel valve in fluid communication with a fuel inlet in fluid communication with the tower, and an ignition source positioned so that it resides within the combustion chamber and is configured to initiate a reaction between oxygen and fuel.

20 Claims, 2 Drawing Sheets

(56) References Cited

U.S. PATENT DOCUMENTS

| | | | |
|---|---|---|---|
| 4,304,095 A | 12/1981 | Rasanen | |
| 4,644,905 A | 2/1987 | Vierling | |
| 4,841,731 A | 6/1989 | Tindell | |
| 5,953,900 A | 9/1999 | Bannister et al. | |
| 5,956,937 A | 9/1999 | Beichel | |
| 6,032,467 A | 3/2000 | Oshita et al. | |
| 6,523,349 B2 | 2/2003 | Viteri | |
| 6,945,029 B2 | 9/2005 | Viteri | |
| 7,546,732 B2 * | 6/2009 | Glasgow et al. | 60/677 |
| 2003/0131582 A1 | 7/2003 | Anderson et al. | |
| 2009/0193807 A1 | 8/2009 | Glasgow et al. | |

OTHER PUBLICATIONS

Chapman, "England's Leonardo: Robert Hooke (1635-1703) and the Art of Experiment in Restoration England," Proceedings of the Royal Institute of Great Britain 67, 1996, pp. 239-275, http://www/rod.beavon.clara.net/leonardo.htm, 27 pages downloaded from the World Wide Web on or about Dec. 30, 2005.

Kumakura et al., "Combustion Characteristics of Stoichiometric Hydrogen and Oxygen Mixture in Water," Int. J. Hydrogen Energy, 1992, vol. 17(11), pp. 887-894.

Rhodes, "Common Duct Electrolytic Oxyhydrogen," Superhot Atomic Oxy-Hydrogen Flame, KeelyNet Mar. 18, 2000, http://www.keelynet.com/energy/oxyhyd2.htm, 8 pages downloaded from the World Wide Web on or about Dec. 14, 2005.

Sternfield et al., "A Demonstration Plant for the Hydrogen-Oxygen Spinning Reserve," Int. J. Hydrogen Energy, 1989, vol. 14(10), pp. 703-716.

Sugista et al., "A Study of Thermodynamic Cycle and System Configurations of Hydrogen Combustion Turbines," Int. J. Hydrogen Energy, 1998, vol. 23(8), pp. 705-712.

Sugista et al., "A Study of Advanced Hydrogen/Oxygen Combustion Turbines," Hydrogen Power: Theoretical and Engineering Solution, 1998, Kluwer Academic Publishers, pp. 511-514.

Taniguchi et al., "Major Auxillary Equipment Needs for the World Energy Network Project," Energy Conversion and Management, 2001, vol. 42, pp. 1831-1837.

"Combustion," The Chemistry of Combustion in Plain English, http://energyconcepts.tripod.com/energyconcepts/combustionfluegasses.htm, 13 pages downloaded and printed from the World Wide Web on or about Dec. 14, 2005.

Hydrogen Fuel Cell Engines and Related Technologies (Dec. 2001), "Module 3: Hydrogen Use in Internal Combustion Engines," College of the Desert.

"Steam Engine," Wikipedia, http://en.wikipedia.org/wiki/Steam_engine, 10 pages downloaded and printed from the World Wide Web on or about Dec. 29, 2005.

"The Hydrogen Engine," University of Cambridge Department of Engineering, http://www.eng.cam.ac.uk/DesignOffice/projects/cecil/engine.html, 2 pages downloaded and printed from the World Wide Web on or about Dec. 21, 2005.

"Tracts Written by the Honourable Robert Boyle, Containing New Experiments, Touching the Relation Between Flame and Air. And About Explosions . . . " New York: McGraw Hill, 1952, http://web.lemoyne.edu/~giunta/boyle.html, 4 pages downloaded and printed from the World Wide Web on or about Dec. 30, 2005.

"Water-tube Boiler," Wikipedia, http://en.wikipedia.org/wiki/Water-tube_boiler, 2 pages downloaded and printed from the World Wide Web on or about Mar. 20, 2006.

Office Action for U.S. Appl. No. 11/385,590, dated Nov. 12, 2008.

Notice of Allowance for U.S. Appl. No. 11/385,590, dated Apr. 7, 2009.

Office Action issued in U.S. Appl. No. 12/422,537, on Apr. 27, 2011.

Invitation to Pay Additional Fees for International Application No. PCT/US2007/006306, mailed on May 26, 2010, in 9 pages.

International Search Report and Written Opinion for International Application No. PCT/US2007/006306, mailed on Oct. 7, 2010, in 22 pages.

International Preliminary Report on Patentability and Written Opinion for International Application No. PCT/US2007/006306, mailed on Oct. 21, 2010, in 13 pages.

* cited by examiner

DYNAMIC COMBUSTION CHAMBER

CROSS-REFERENCE TO RELATED APPLICATIONS

This application is a continuation of U.S. patent application Ser. No. 12/422,537, filed Apr. 13, 2009, which is a continuation of U.S. patent application Ser. No. 11/385,590, filed Mar. 21, 2006 and issued as U.S. Pat. No. 7,546,732 on Jun. 16, 2009, each of which is incorporated herein by reference in its entirety.

BACKGROUND OF THE INVENTION

1. Field of the Invention

The invention relates generally to the field of heat generation. More specifically, the invention relates to an apparatus and method for generating heat from a chemical reaction.

2. Description of the Related Art

As the world's population grows and modernizes, the demand for electricity also grows. One option is to build more traditional electric power plants. However, power plants that produce electricity typically also produce high levels of pollution. For example, coal, oil, and natural gas plants burn hydrocarbons to produce energy, but also produce large quantities of greenhouse gases such as carbon monoxide, carbon dioxide, and nitrogen oxides, as well as mercury and sulfur oxides. Additionally, the fuels used in traditional power plants are non-renewable resources that may run out within this century.

An alternative to traditional power plants is nuclear power. Fission reactors generate heat that results from the nuclear fission of uranium, and use that heat to produce steam. The steam is fed into steam turbine that converts the energy stored in the steam into electricity. While nuclear power plants do not produce greenhouse gases, they do produce nuclear waste, which is toxic and takes millennia to degrade. Furthermore, history has shown that accidents at nuclear plants can have disastrous consequences. As such, nuclear plants are preferably located in isolated areas. However, large urban areas usually do not have the space available for such remote energy sources.

Other alternatives to traditional power plants that do not produce greenhouse gases use solar, wind, and wave energy to produce electricity. In addition to being in the early stages of development, a major drawback to these energy sources is that they lack certainty. For example, when the sun is not shining, the wind is not blowing, or the water is not moving, these sources will not produce electricity. Thus, a need remains for a power source that does not produce greenhouse gases, is not disastrously dangerous, is renewable, and has a high degree of certainty.

SUMMARY OF THE INVENTION

In one aspect, the present invention provides a system for converting potential energy into heat comprising a tower, a first tower outlet, a first valve, an oxygen source, an oxygen valve, a combustible fuel source, a fuel valve, and an ignition source. The tower is configured to be oriented vertically when in an operating mode at an intended site of use. The tower is further configured to contain a first fluid in a sealable manner therein and to permit the formation of a substantially nitrogen-free combustion chamber at a pressure less than the ambient pressure proximate to the tower at the intended site of use when in the operating mode. The combustion chamber is dynamically defined by walls of a first end of the vertically-oriented tower and the top surface of the first fluid contained in the tower during use. The first tower outlet is proximate to a second end of the tower. The second end defines the lower portion of the tower when in the operating mode. The first valve is in fluid communication with the first tower outlet. The first valve is configured to regulate a flow of the first fluid out of the tower. The oxygen source is configured to supply a flow of oxygen from the oxygen source to the resulting combustion chamber in the tower when in use through an oxygen inlet in fluid communication with the tower and the oxygen source. The oxygen valve is in fluid communication with the oxygen source and the oxygen inlet. The oxygen valve is configured to regulate the flow of oxygen out of the oxygen source into the tower through the oxygen inlet. The combustible fuel source is configured to supply a flow of fuel comprising hydrogen from the combustible fuel source to the combustion chamber through a fuel inlet in fluid communication with the tower and the combustible fuel source. The fuel valve is in fluid communication with the combustible fuel source and the fuel inlet configured to regulate the flow of fuel out of the combustible fuel source into the tower through the fuel inlet. The ignition source is positioned proximate to a first end of the tower so that it resides within the combustion chamber and configured to initiate an exothermic reaction between the flow of oxygen and the flow of fuel so as to produce $H_2O$ when in the operating mode.

In another aspect, the present invention provides a method of generating heat from an exothermic reaction of oxygen with a combustible fuel. The reaction products comprise minimal impurities. The method comprises providing a combustion chamber substantially free of nitrogen and at a pressure less than an ambient pressure outside and proximate to the combustion chamber, directing a flow of oxygen into the chamber through an oxygen inlet in fluid communication with the combustion chamber, directing a flow of the combustible fuel into the chamber through a fuel inlet in fluid communication with the combustion chamber, and igniting the reaction between the oxygen and the combustible fuel, thereby generating heat.

In yet another aspect, the present invention provides a method of creating a dynamic combustion chamber substantially free of nitrogen and at a pressure less than an ambient pressure outside and proximate to the chamber. The chamber is adapted to house a combustion reaction between oxygen and a fuel comprising hydrogen that produces heat and reduced impurities. The method comprises providing a sealable vertically-oriented tower comprising combustion reactant inlets deliverable to an enclosed top end of the tower. The tower height is greater than the ratio of the ambient pressure to the density of a fluid adapted to absorb the reaction products. The method further comprises completely filling the tower with the fluid and opening an outlet proximate to the bottom of the tower and in fluid communication with the tower so as to allow the fluid to flow out of the tower, thereby creating the dynamic combustion chamber defined by the enclosed top end of the tower and the top surface of the fluid remaining in the tower.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught or suggested herein without necessarily achieving other objects or advantages as may be taught or suggested herein.

All of these embodiments are intended to be within the scope of the invention herein disclosed. These and other embodiments will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

These and other features, aspects, and advantages of the invention disclosed herein are described below with reference to the drawings of preferred embodiments, which are intended to illustrate and not to limit the invention. The drawings comprise two figures in which.

DETAILED DESCRIPTION OF THE PREFERRED EMBODIMENTS

Although certain preferred embodiments and examples are disclosed below, it will be understood by those in the art that the invention extends beyond the specifically disclosed embodiments and/or uses of the invention and obvious modifications and equivalents thereof. Thus, it is intended that the scope of the invention herein disclosed should not be limited by the particular disclosed embodiments described below.

Figure 1:
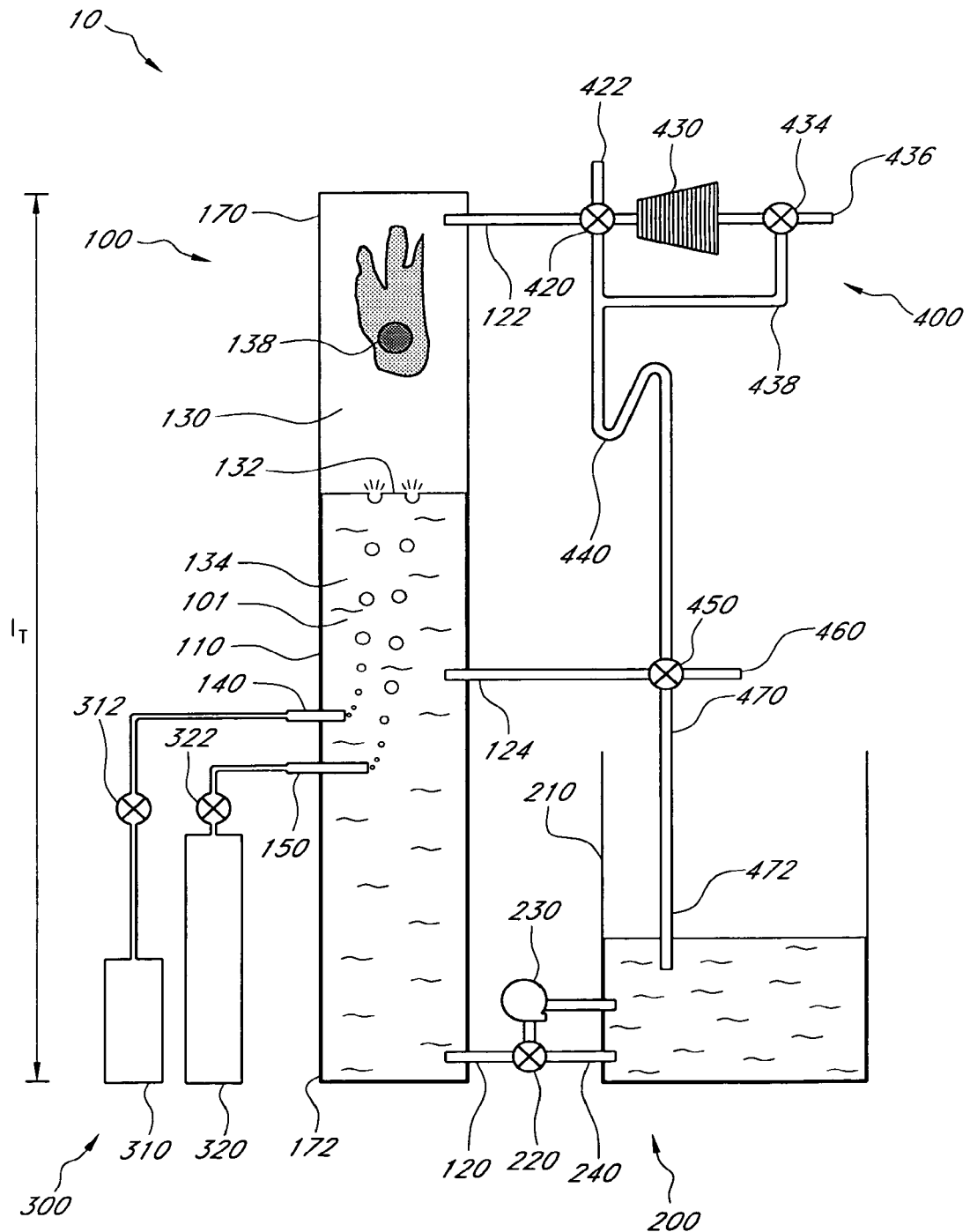
FIG. 1 illustrates an embodiment of a system for generating heat comprising a dynamic combustion chamber.

FIG. 1 illustrates one example of a system 10 for generating heat. The system 10 comprises a tower assembly 100, a first fluid reservoir assembly 200, a reactant assembly 300, and a fluid recirculating assembly 400. The tower assembly 100 comprises a tower 110 at least partially filled with a first fluid 101. The first fluid 101 exits the tower 110 through the first tower outlet 120 and enters the first fluid reservoir assembly 200. The volume of the tower 110 that was previously occupied by the first fluid 101 defines a combustion chamber 130. Reactants from the reactant assembly 300 are fed into the tower 110 and react in the combustion chamber 130. The products of the reaction between the reactants are either absorbed by the first fluid 101 or exit the tower 110 through the second tower outlet 122 and enter the fluid recirculating assembly 400.

In certain embodiments, the tower 110 is vertically oriented in an operative state. In an unoperative state, the tower 110 may be in other positions, for example horizontally oriented. In an operating state, the tower 110 sealably contains a column 134 of a first fluid 101. The length of the tower 110, $l_T$, which is the height of the tower 110 in an operative state, is preferably greater than the ratio of the ambient pressure at the intended site of operation ($P_{amb}$) to the density of the first fluid 101 ($\rho_{FF}$), as shown by Equation 1.

$$l_T > \frac{P_{amb}}{\rho_{FF}} \quad \text{(Eqn. 1)}$$

For example, in an embodiment using pure water as the first fluid 101, pure water has a maximum density at about 39.2° F. (4° C.) of about 8.345 pounds per U.S. gallon (1 gram per cubic centimeter or 1 gram per milliliter), so if the ambient pressure is 1 atmosphere (101.325 kilopascals), the length of the tower 110 is preferably greater than 33.89 feet (10.33 meters). It will be appreciated that the ambient pressure is generally lower at higher altitudes than the ambient pressure at sea level. For example, at an altitude of 1 mile (1.6 km) (e.g., the altitude of Denver, Colo.), atmospheric pressure averages about 0.83 atmospheres (84.12 kPa), so the length of the tower is preferably greater than 28.15 feet (8.58 m). For another example, at an altitude of 1.48 mile (2.4 km) (e.g., the altitude of Mexico City, Mexico), atmospheric pressure averages about 0.76 atmospheres (76.53 kPa), so the length of the tower is preferably greater than 25.75 feet (7.85 m). Thus, high-altitude sites of operation may be advantageously exploited to reduce the height of the tower 110 in an operating state. Additionally, because there is less air at high altitudes, the benefits of not adding pollutants to the air are exacerbated. The length of the tower, $l_T$, is preferably designed based on the intended site of operation, although it will be appreciated that the tower 110 may be used at other locations with a suitable ambient pressure.

As used herein, the term "ambient" is to be given its broadest ordinary meaning including, but not limited to, surrounding, encompassing, and existing or present on all sides. While the ambient pressure will typically be the same as the atmospheric pressure, the system 10 or portions thereof may be placed in a non-atmospheric chamber in some embodiments. As used herein, the term "column" is to be given its broadest possible meaning including, but not limited to, a volume substantially conforming to its container. For example, a column 134 of the first fluid 101 may conform to the interior of the tower 110. The height of the column 134 need not exceed the width of the column 134.

As used herein, the term "intended" is to be given its broadest ordinary meaning including, but not limited to, specified for current or future use. For example, any operation of the system 10 is an intended use, and thus the operation of the system 10 at any site can be the operation of the system 10 at an intended site.

Although the length of the tower, $l_T$, is preferably greater than the ratio of the ambient pressure to the density of the first fluid 101 in an operating state, the tower 110 may comprise a plurality of pieces for portability purposes. For example, a 40 foot (12.19 m) tower may comprise eight 5-foot (1.52-m) sections that can fit into the trunk of a standard passenger automobile. When the tower 110 comprises a plurality of pieces, the junctions between the pieces are preferably water tight and are more preferably vacuum tight when the tower 110 is assembled. As used herein, the term "portable" is to be given its broadest ordinary meaning including, but not limited to, capable of easily or conveniently being transported from one place to another. For example, a household gasoline generator would be considered portable, but a coal power plant would not be considered portable. The tower 110 may be assembled on site from the plurality of pieces. Supports such as a tripod, concrete base, sandbags, etc. may aid in vertically orienting the tower 110 when in an operative state at its intended site of operation.

As used herein, the term "tower" is to be given its broadest possible meaning including, but not limited to, a container configured to hold a fluid. The width of the tower 110 may be larger than the height of the tower 110 in the operative state, and the tower 110 may comprise shapes other than cylindrical or columnar. For example, in some embodiments, the base of the tower 110 is wider than the top of the tower 110. For another example, the tower may comprise a cavity in the side of a hill.

In certain embodiments, the height of the tower 110 in an operating state may be veiled by positioning the base of the vertically-oriented tower other than at ground level at the site of operation. For example, in a residential application, the bottom end 172 of the tower 110 in the operating state may be underground, with the combustion chamber 130 proximate to ground level. In a high-rise commercial application, the bottom end 172 of the tower 110 in the operating state may occupy a portion of the top three floors, with the combustion chamber 130 on the roof. In a marine application, the bottom end 172 of the tower 110 in the operating state may be below the hull of the ship, with the combustion chamber 130 above the level of the deck.

The tower 110 further comprises a first tower outlet 120 proximate to the bottom end 172 of the tower 110 when the tower 110 is in an operative state. The first tower outlet 120 is in fluid communication with the column 134 of the first fluid 101 in the tower 110 such that the first fluid 101 may flow into and out of the tower 110 through the first tower outlet 120. In a preferred embodiment, the first fluid 101 flows out of the tower 110 through the first tower outlet 120 to the first fluid reservoir assembly 200.

The first fluid reservoir assembly 200 comprises a first fluid reservoir 210. The volume of the first fluid reservoir 210 is preferably at least greater than the volume of the combustion chamber 130 that results when the tower 110 is in an operative state in order to avoid overflow of the first fluid 101 out of the first fluid reservoir 210. In certain embodiments, the first fluid reservoir 210 substantially surrounds the tower 110. In some embodiments, the first fluid reservoir 210 is detachable from the tower 110. In an embodiment in which the tower 110 comprises a cavity in the side of a hill, the first fluid reservoir 210 may comprise a body of water such as a lake.

In certain embodiments, a first tower outlet valve 220 is disposed between the first tower outlet 120 and the first fluid reservoir 210. The first fluid valve 220 is configured to regulate the flow of the first fluid 101 between the tower 110 and the first fluid reservoir 210. In certain embodiments, the first fluid valve 220 is configured to direct the flow of the first fluid 101 of the tower 110 into the first fluid reservoir 210 when the height of the column 134 of the first fluid 101 in the tower 110 exceeds the ratio of the ambient pressure at the site of operation to the density of the first fluid 101. In some embodiments, the first fluid valve 220 is configured to direct the flow of the first fluid 101 of the tower 110 into the first fluid reservoir 210 when the pressure in the combustion chamber 130 exceeds the ambient pressure.

The top surface 132 of the first fluid 101 and the top enclosed end 170 of the tower 110 dynamically or barometrically define a combustion chamber 130. The combustion chamber 130 is dynamically or barometrically defined because the volume of the chamber 130 changes as the height of the top surface 132 of the column 134 of the first fluid 101 changes.

In an unoperative state, the tower 110 does not contain a column 132 of the first fluid 101. The tower 110 may contain some first fluid 101 or another fluid during the unoperative state. The tower 110 is then completely filled with the first fluid 101 such that the column 134 of the first fluid 101 spans the length, $l_T$, of the tower 110. Preferably, the tower 110 is filled with the first fluid 101 when in a substantially vertical orientation. The tower 110 may be filled with the first fluid 101 when, for example, in a substantially horizontal orientation, although it will be appreciated that subsequently vertically orienting the tower 110 may be difficult due to the added weight of the first fluid 101 within the tower 110. The tower 110 is sealed such that the tower 110 contains the first fluid 101 and substantially no air. For example, the first tower outlet valve 220 may be closed. At this point, there is no top surface 132 of the column 134 of the first fluid 101, so there is no combustion chamber 130 in the tower 110. Once the tower 110 is substantially devoid of air, the combustion chamber 130 may be formed. Preferably, the first fluid 101 fills the entire tower 110 such that no air, other fluid, etc. occupies the tower 110.

The first fluid valve 220 can be manipulated to direct the flow of the first fluid 101 of the tower 110 through the first tower outlet 120. If the height of the first fluid 101 is greater than the ratio of the ambient pressure to the density of the first fluid 101, the pressure due to the weight of the first fluid 101 will exceed the ambient pressure. Thus, the first fluid 101 will flow out of the tower 110 through the first tower outlet 120.

Once the first fluid 101 has flowed out of the tower 110, the volume in the tower 110 that was occupied by the first fluid 101 is not occupied by liquid first fluid 101, thereby creating the combustion chamber 130. The volume of the combustion chamber 130 may change with the ambient pressure, so it may be called a "dynamic combustion chamber" (or "barometric combustion chamber") 130. At least one aspect of the present invention is the realization that utilization of the weight of the first fluid 101 to form the combustion chamber 130 is similar to the creation of a Torricelli vacuum in a fluid barometer, and that such a chamber is substantially devoid of air. Once the combustion chamber 130 is formed, the ambient pressure proximate to the tower 110 may change, which would cause a corresponding change in the barometric height of the first fluid 101 in the tower 110. The combustion chamber 130 may contain vapor from the first fluid 101. Once some of the first fluid 101 has flowed out of the tower 110, the column 134 of the first fluid 101 then has a top surface 132, which, together with the top end 170 of the tower 110, defines the combustion chamber 130.

In some embodiments, a vacuum pump 230 in fluid communication with the tower 110, for example downstream of the first tower outlet 120, pumps the first fluid 101 out of the tower 110. The first fluid reservoir assembly 200 may direct the pumped first fluid 101 into the first fluid reservoir 210. Regardless of the weight of the first fluid 101 in the tower 110 or the length of the tower, $l_T$, after pumping the first fluid 101 out of the tower 110, the volume in the tower 110 that was occupied by the first fluid 101 is not occupied by liquid first fluid 101. The first fluid 101 then has a top surface 132, which, together with the top end 170 of the tower 110, defines the combustion chamber 130. The combustion chamber 130 may contain vapor from the first fluid 101. In an embodiment in which the length of the tower, $l_T$, is less than the ratio of the ambient pressure to the density of the first fluid 101, the first fluid outlet valve 220 is preferably closed prior to complete evacuation of the first fluid 101 from the tower 110. In embodiments in which the length of the tower, $l_T$, is greater than the ratio of the ambient pressure to the density of the first fluid 101, the first fluid outlet valve 220 would not need to be shut because the first fluid 101 would not be prone to flowing out of the tower 110. The first tower outlet 120 may be left in fluid communication with the first fluid reservoir 210, in which case the volume of the combustion chamber 130 may change with the ambient pressure. Thus, a combustion chamber 130 formed in this manner, under the appropriate circumstances, may also be called a "dynamic combustion chamber" (or "barometric combustion chamber") 130. Embodiments involving a vacuum pump 230 are not preferred to embodiments utilizing the weight of the first fluid 101 because operation of the vacuum pump 230 generally requires electricity and/or intensive manual labor. However, such embodiments advantageously may reduce the size of the tower 110.

In some embodiments, the tower 110 is not filled with the first fluid 501. For example, the tower 110 may be filled with air. A vacuum pump 230 in fluid communication with the tower 110, for example downstream of the first tower outlet 120, may pump the air out of the tower 110. Regardless of the weight of the first fluid 101 or the length of the tower, $l_T$, after pumping the air out of the tower 110, the volume in the tower 110 that was occupied by the air is at a reduced pressure. A volume of first fluid 101 can then be pumped into the tower 110, which will somewhat increase the pressure within the tower 110. The first fluid 101 then has a top surface 132, which, together with the top end 170 of the tower 110, defines the combustion chamber 130. It will be appreciated that the pressure before adding the first fluid 101 should be low enough that the combustion chamber 130 is initially at a pressure below atmospheric pressure. The combustion chamber 130 may contain vapor from the first fluid 101. In an embodiment in which the length of the tower, $l_T$, is less than the ratio of the ambient pressure to the density of the first fluid 101, the first fluid outlet valve 220 is preferably closed prior to adding first fluid 101 to the tower 110. In embodiments in which the length of the tower, $l_T$, is greater than the ratio of the ambient pressure to the density of the first fluid 101, the first fluid outlet valve 220 may be opened after adding the first fluid 101 if the pressure of the combustion chamber 130 is sufficiently low because the first fluid 101 would not be prone to flowing out of the tower 110. The first tower outlet 120 may be in fluid communication with the first fluid reservoir 210, in which case the volume of the combustion chamber 130 may change with the ambient pressure. Thus, a combustion chamber 130 formed in this manner, under the appropriate circumstances, may also be called a "dynamic combustion chamber" (or "barometric combustion chamber") 130. Embodiments involving a vacuum pump 230 are not preferred to embodiments utilizing the weight of the first fluid 101 because operation of the vacuum pump 230 generally requires electricity and/or intensive manual labor. However, such embodiments advantageously may reduce the size of the tower 110.

The resulting combustion chamber 130 is substantially free of nitrogen because air, which comprises about 78.1% nitrogen gas ($N_2$), is unable to flow into the combustion chamber 130, which is sealably contained within the tower 110. Additionally, the combustion chamber 130 is at a pressure lower than the ambient pressure proximate to the tower 110 at the site of operation when in the operating mode due to either the Torricelli vacuum effect or pump evacuation.

The potential for low pressures in the combustion chamber 130 formed within the tower 110 makes it desirable for the tower 110 to comprise a material that is able to withstand pressures near vacuum. For high temperatures, suitable low-pressure materials include, but are not limited to, stainless steel, nickel, cobalt, titanium alloys, etc. For low temperatures, suitable low-pressure materials include, but are not limited to, aluminum (non-anodized), aluminum copper alloy ("aluminum bronze"), brass, glass-to-metal seals, glass-to-ceramic seals, etc. However, the tower 110 desirably also comprises a material that does not substantially deform when exposed to high-temperature combustion, for example above 3,000° C. These materials include, but are not limited to, steel (e.g., stainless steel), nickel, cobalt, titanium, high temperature ceramics, etc. In certain embodiments, the tower 110 comprises a material suitable for high temperatures reinforced with a material designed to withstand low pressures. In some embodiments, the tower 110 comprises different materials throughout its length, $l_T$, for example stainless steel at one end and mild steel, concrete, fiberglass, or PVC at another end.

The tower 110 further comprises an ignition source 138 positioned proximate to the first end 170 of the tower 110 so that it resides within the combustion chamber 130 when the tower 110 is in the operating state. The ignition source 138 is configured to initiate a reaction between the reactants in the combustion chamber 130. The ignition source 138 may comprise, for example and without limitation, electrical sparks and arcs from electrical circuits, motors, switches, etc., electrical sparks from static, mechanical sparks from friction and falling objects, a flame, a hot surface, and radiation from microwaves, radio frequencies, etc. In a preferred embodiment, the ignition source 138 initiates an exothermic reaction in the combustion chamber 130, after which the reaction is self-sustaining with the continued supply of reactants. The ignition source 138 preferably comprises material that is able to withstand low pressures and high temperatures, as described above with regard to the tower 110.

In embodiments comprising an ignition source 138 below the surface 132 of the first fluid 101, the tower 110 may act as a heater of the first fluid 101. The location of the tower inlets 140, 150 and the flowrates of the reactants are preferably optimized to produce a flame even though under the reaction occurs below the surface 132 of the first fluid 101. For example, the tower inlets 140, 150 may direct the flows of reactants to a point proximate to the ignition source 138. For another example, the tower inlets 140, 150 may direct the flows of reactants to an annual space for ignition in which the ignition source 138 is disposed. The annual space for ignition may be positioned proximate to an interior wall of the tower 110, proximate to the center of the tower 110, or suitable position therebetween. The annual space may also be positioned at any vertical height that is below the surface 132 of the first fluid 101 and above a height needed to allow the resulting flame to heat the water. Preferably, the ignition source 138 and tower inlets 140, 150 are configured such that the flame does not heat the walls of the tower 110. Heated first fluid 101 may exit the tower 110, for example, through the first tower outlet 120, and then may be directed to various uses. For example, the first fluid 101 may comprise water, and the heated water may be used as a hot water supply for appliances, sinks, showers, cooking, etc. In some embodiments, the system 10 comprises ignition sources both above and below the surface 132 of the first fluid 101. For instance, such a system would be useful to utilize the reactants that do not react under the surface 132 of the first fluid 101.

The reactant assembly 300 comprises an oxygen source 310, a combustible fuel source 320, and combustion reactant inlets 140 and 150. Although illustrated entering the tower 110 below the combustion chamber 130, the reactant inlets 140, 150 may be fed directly into the combustion chamber 130. In an alternative embodiment, the tower 110 comprises an oxygen source 310, a combustible fuel source 320, and a single reactor inlet disposed after a combustion reactant mixing point, although this may disadvantageously lead to combustion outside of the tower 110.

In certain embodiments, the tower 110 comprises an ignition source positioned proximate to the reactant inlets 140, 150. Such a configuration may be useful, for example, in embodiments that use a combust the reactants below the surface 132 of the first fluid 501, described in detail below.

The reactant inlet 140 is in fluid communication with the oxygen source 310. The oxygen source 310 is preferably sized to mitigate flammable materials safety concerns, and may be sized according to usage. For example, the capacity of the oxygen source 310 may be designed to last for several hours, days, weeks, months, or years, preferably days, weeks, or months, without replacement or recharging. For another example, oxygen may be hard-piped from a distribution and transmission center, as described below (e.g., similar to natural gas).

The reactant inlet 150 is in fluid communication with the combustible fuel source 320. In a preferred embodiment, the combustible fuel source 320 contains compressed pure hydrogen gas ($H_2$), although the combustible fuel source 320 may contain any fuel comprising hydrogen, for example methane, ethane, propane, butane, pentane, hexane, heptane, octane, diesel fuel, biodiesel, methanol, ethanol, propanol, butanol, materials related to the byproducts of coal gasification, etc. In some embodiments, the combustible fuel source 320 comprises a plurality of fuels comprising hydrogen or a fuel comprising hydrogen and a fuel without hydrogen. In certain embodiments, the combustible fuel source 320 comprises a system that generates the combustible fuel, for example an electrode that separates water into oxygen and hydrogen gas. The combustible fuel source 320 is preferably sized to mitigate flammable material safety concerns, and may be sized according to usage. For example, the capacity of the combustible fuel source 320 may be designed to last for several hours, days, weeks, months, or years, preferably days, weeks, or months, without replacement or recharging. For another example, the combustible fuel may be hard-piped from a distribution and transmission center, as described below (e.g., similar to natural gas). In certain embodiments, the size of the combustible fuel source 320 may be stoichiometrically proportional to the size of the oxygen source 310. The combustible fuel source 320 is preferably located in a position that mitigates damage from accidental explosion.

When the combustible fuel comprises hydrogen gas, it will be appreciated that the molecules are small and that leakage can be an issue. As such, care should be taken to ensure that the seals around all junctions in the system 10 are tightly sealed, for example rated for vacuum. Safety concerns associated with potential leakage of oxygen or combustible fuel can be mitigated by storing, piping, and transferring the reactants in secondary containment or under water (e.g., in a lake, pond, or other body of water, natural or man-made). In such an embodiment, escaped gases may be directed back to the bottom end 172 of the tower 110 in the operating state so as to allow the gases to be consumed in the combustion chamber 130.

One aspect of the present invention is the generation of heat and minimal impurities. Thus, the oxygen and the combustible fuel are preferably pure (e.g., greater than 99% pure) and more preferably ultra pure (e.g., at or greater than industry purity of 99.995% for hydrogen gas and at or greater than 99.5% for oxygen gas). In certain embodiments, the reactant sources 310, 320 comprise multiple tanks such that replacement or recharging of one tank does not disrupt the flow of the reactants into the tower 110.

The flow of oxygen into the tower 110 may be directed by a valve 312 in fluid communication with the oxygen source 310 and the reactant inlet 140, and the flow of combustible fuel into the tower 110 may be directed by a valve 322 in fluid communication with the combustible fuel source 320 and the reactant inlet 150. In certain embodiments, the valves 312, 322 are configured to deliver reactants to the combustion chamber 130 only after the combustion chamber 130 has been formed in order to avoid building pressure greater than the ambient pressure within the tower 110.

The reactant inlets 140, 150 are in fluid communication with the tower 110, and are configured to direct a flow of the reactants to the combustion chamber 130. In one embodiment, the reactant inlets 140, 150 are located in a portion of the tower configured to be within the combustion chamber 130 in an operative state. In an alternative embodiment, the reactant inlets 140, 150 are located in a portion of the tower 110 that is not configured to be within the combustion chamber 130 in an operative state. In such an embodiment, the reactants can be "bubbled" through the first fluid 101 towards the combustion chamber 130. The reactants preferably are not highly soluble in the first fluid 101 (e.g., with solubilities below 50 milligrams per liter).

In certain embodiments of the tower 110, the shape of the tower 110 is such that adding inputs and outputs to the sides of the tower 110 may compromise the integrity of the tower 110. As such, the inputs and outputs are preferably disposed in the ends of the tower 110. For example, in an embodiment in which the tower 110 comprises a cylinder, placement of the inputs and/or outputs in the flat ends of the cylinder is preferably to placement of the inputs and/or outputs in the rounded sides of the cylinder.

The reactants in the combustion chamber 130 are ignited by the ignition source 138. The reaction between the reactants comprises exothermic combustion that generates water and energy ($\Delta H$). When the combustible fuel comprises only $H_2$ and the water produced is only liquid, the enthalpy of reaction is about 486 kilojoules per mole of water (kJ/mol). Preferably, at least some of the water produced by the reaction is in the form of steam. When the combustible fuel comprises only $H_2$ and the water produced is only steam, the enthalpy of reaction is about 442 kJ/mol (i.e., about 44 kJ/mol evaporate the mole of liquid water). Thus, depending on the ratio of liquid to steam produced, the energy produced by the reaction is between about 442 and 486 kJ/mol for systems in which the combustible fuel comprises substantially all $H_2$. In a preferred embodiment involving the combustion of hydrogen gas, the reaction produces water and substantially no byproducts.

At least one aspect of the present invention is the realization that combustion of hydrogen in the presence of air produces temperatures so hot (e.g., greater than 3,000° F. or 1,650° C.) that nitrogen gas in the air begins to react with oxygen to form impurities such as nitrogen oxides (NOx). Nitrogen oxides play a major role in the formation of ground-level ozone pollution (i.e., smog), which causes wide-ranging damage to human health and the environment. Additionally, NOx contribute to the formation of fine particulate matter pollution, which can aggravate respiratory illnesses and cause premature death in the elderly and infants. By contrast, combustion of hydrogen in a combustion chamber 130 that is substantially free of nitrogen produces minimal impurities such as NOx.

Like the reaction of oxygen and a combustible fuel comprising hydrogen in the combustion chamber 130, the reaction of oxygen and a combustible fuel comprising hydrogen beneath the surface 132 of the first fluid 101 produces water and few impurities. For example, there is no air beneath the surface 132 of the first fluid 101, so there is no nitrogen, as described below. Additionally, the heat transfer that results from the reaction's sparging of the first fluid 101 is nearly 100%, compared to about 80% heat transfer in conventional heat exchangers. This higher efficiency reduces the amount of reactants that need to be used to create heat, electricity, etc.

In certain embodiments, the water that is a product of the combustion reaction is absorbed by the column 134 of the first fluid 101. In such embodiments, the first fluid 101 is preferably water. The increase in fluid volume inside the tower 110 may require the first fluid valve 220 to be set to allow the discharge of additional first fluid 101 from the tower 110 into the first fluid reservoir 210 through the first tower outlet 120.

In some embodiments, the water in the form of steam that is a product of the combustion reaction is utilized. Steam has a variety of industrial, commercial, and residential uses, including, but not limited to, use for heating, use for cleaning, use for generation of electricity through a steam turbine, use for cooking, use for driving heat pumps for cooling, use for steam injection of petroleum wells, use in refining petroleum products, use for sterilization, use for pasteurization, use for manufacturing, etc. FIG. 1 illustrates several exemplary uses for steam generated in the reaction chamber 130.

In certain embodiments, the tower 110 comprises a second tower outlet 122 proximate to the top end 170 of the tower 110 and in fluid communication with the fluid recirculating loop 400. The second tower outlet 122 is configured to direct a flow of steam out of the tower 110 when the tower 110 is in the operating mode. The fluid recirculating loop 400 may comprise a steam valve 420 configured to direct the flow of steam out of the tower 110. In some embodiments, the steam valve 420 directs the flow of steam, for example to an apparatus that uses steam such as a boiler via line 422, a steam turbine 430, etc. In alternative embodiments, the steam flowing out of the tower 110 through the second tower outlet 122 is condensed in condenser 440. The condensed steam may be directed by a valve 450 for various purposes, for example as a water source via outlet 460, to provide water to the first fluid column 134 via tower inlet 124, or to provide water to the first fluid reservoir 210 via outlet 470. In embodiments in which the first fluid reservoir 210 is enclosed, the condensed steam may enter through the fluid reservoir inlet 472. In some embodiments, the steam is condensed after utilization, for example after passing through the steam turbine 430 as directed by valve 434 through line 438. The steam may also be used serially for multiple purposes, for example as directed by valve 434 to line 436.

In certain embodiments, the valves 220 and/or 420 can be manipulated to cause water within the tower 110 to become superheated steam. For example, the valves 220, 420 can be closed or restricted such that steam within the tower 110 cannot vent, causing pressure and/or temperature to build up within the combustion chamber 130, thereby creating superheated steam. For example, the valve 220 may be a pressure regulating valve. The valve 420 may then be opened to allow the superheated steam to vent. Superheated steam is more useful than steam at 100° C. for many purposes, for example electricity generation using a steam turbine 430, due to the greater amount of energy stored in superheated steam, as well as being less damaging to some turbines, as described below.

Figure 2:
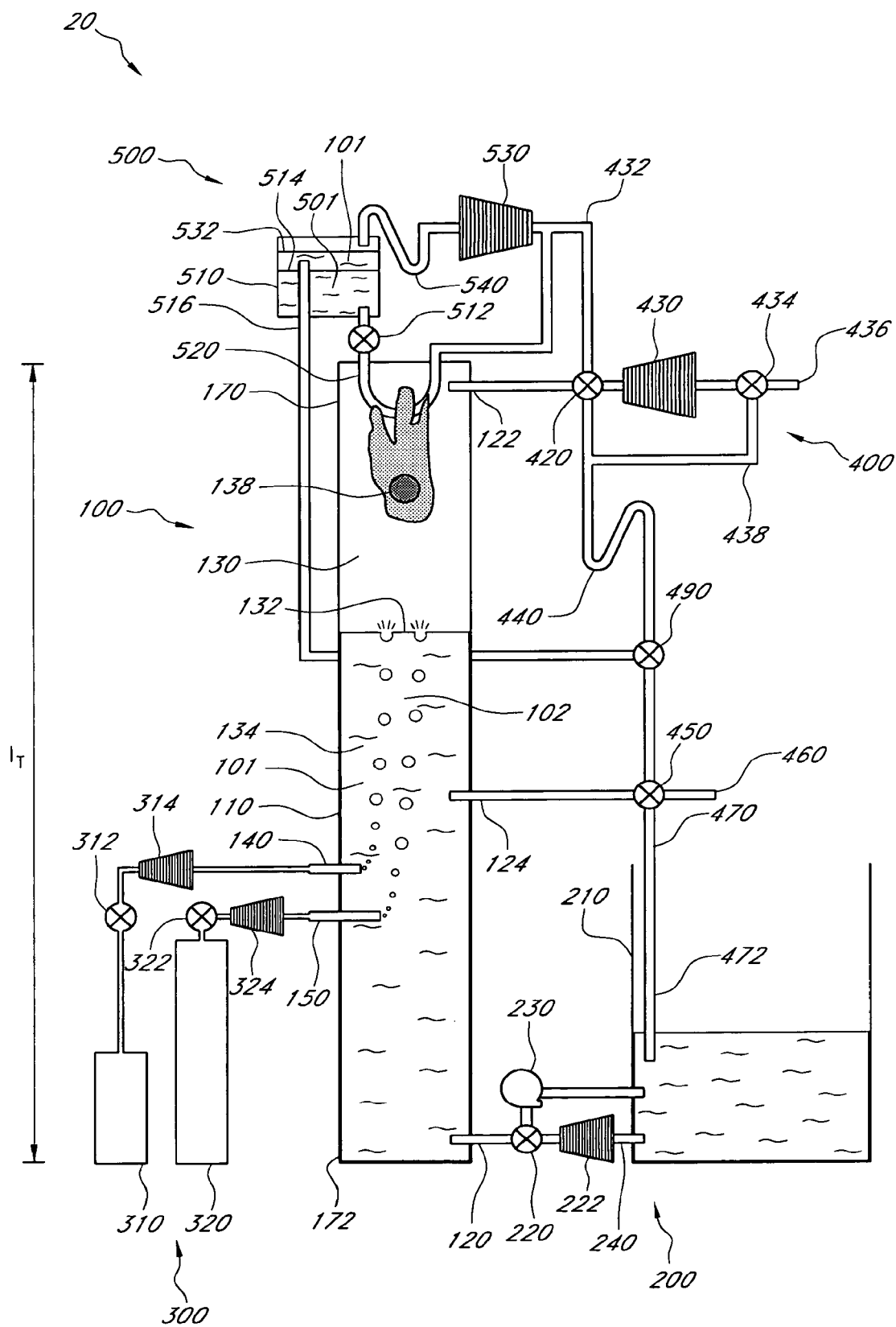
FIG. 2 illustrates another embodiment of a system for generating heat comprising a dynamic combustion chamber.

FIG. 2 illustrates an embodiment in which a system 20 comprises a second fluid circulation loop 500 containing a second fluid 501. The second fluid circulation loop 500 may be an "open" system or a "closed" system. In a closed system, the second fluid 501 does not mix with the first fluid 101 or the steam generated in the combustion chamber 130. In an open system, the first fluid 101 and/or steam generated in the combustion chamber 130 can be mixed with the second fluid 501.

The second fluid circulating loop 500 comprises a second fluid reservoir 510 configured to contain at least some of the second fluid 501. The second fluid 501 can flow out of the second fluid reservoir 510 into a heat exchanger 520 in fluid communication with the second fluid reservoir 510.

The heat exchanger 520 is in thermal communication with the tower 110, and preferably is in thermal communication with the combustion chamber 130 within the tower 110. Energy produced in the combustion chamber 130 can be transferred to the second fluid 501 in the heat exchanger 520. The heat exchanger 520 is configured to vaporize at least a portion of the second fluid 501 in the heat exchanger 520. In certain embodiments (not shown), the heat exchanger 520 is in thermal communication with the tower 110 through a heat transfer layer interposed between the heat exchanger 520 and the tower 110 on the outside of the tower 110. In other embodiments (e.g., as depicted in FIG. 2), the heat exchanger 520 is disposed at least partially inside of the tower 110 such that the heat exchanger 520 is configured to directly contact the flame that results from a combustion reaction in the combustion chamber 130. The heat exchanger 520 may comprise a plurality of fins, coils, water wall tubes, etc. to increase the area available for heat transfer. The heat exchanger 520 preferably comprises material that is able to withstand low pressures and high temperatures, as described above with regard to the tower 110. The heat exchanger 520 is configured to vaporize at least a portion of the second fluid 501 in the heat exchanger 520.

The vaporized second fluid 501 flows into a main turbine 530 in fluid communication with, and downstream of, the heat exchanger 520. The main turbine 530 is configured to generate electricity from the passage therethrough of the vaporized second fluid 501, as described in detail below. In embodiments in which the second fluid 501 comprises water, the main turbine 530 may be a steam turbine.

The second fluid circulating loop 500 further comprises a second fluid condenser 540 in fluid communication with, and downstream of, the main turbine 530 and in fluid communication with, and upstream of, the second fluid reservoir 510. The second fluid condenser 540 is configured to condense at least a portion of the vaporized second fluid 501 that has passed through the main turbine 530 and to direct the second fluid 501 into the second fluid reservoir 510, where the second fluid 501 may recirculate through the second fluid circulating loop 500.

In certain embodiments, a second fluid circulating loop valve 512 direct the flow of the second fluid 501 through the second fluid circulating loop 500, and thus the flow of the second fluid 501 through the main turbine 530. As depicted in FIG. 2, the flow of the second fluid 501 may be caused by natural circulation (convection) or forced circulation and the energy from the reaction in the combustion chamber 130. The second fluid reservoir 510 is positioned above the heat exchanger 520 such that the second fluid 501 flows down into the heat exchanger 520. As the second fluid 501 is vaporized in the heat exchanger 520, the vaporized second fluid 501 flows up into the main turbine 530 due to natural forces for example a pressure differential, or it can be driven by forced circulation using pumps and check valves. New volumes of the second fluid 501 may then flow into the heat exchanger 520 to replace the vaporized second fluid 501. The second fluid condenser 540 is preferably below the main turbine 530 but above the second fluid reservoir 510 such that condensed second fluid 501 flows downstream into the second fluid reservoir 510.

Although not illustrated in FIG. 2, the second fluid circulating loop 500 may comprise a deaerator downstream of the condenser 540 to vent non-condensable gases and a low and/or high pressure heater downstream of the deaerator to pressurize the second fluid 501 entering the second fluid reservoir 510.

Droplets of liquid second fluid 501 may be harmful to the main turbine 540. In order to prevent liquid second fluid 501 from entering the main turbine 530, in certain embodiments the second fluid reservoir 510 acts as a feedwater drum for the heat exchanger 510. The second fluid circulating loop may further comprise a vaporized second fluid drum to ensure that the second fluid 501 exiting the heat exchanger 520 is fully vaporized by returning unvaporized second fluid 501 to the second fluid reservoir 510 and sending vaporized second fluid 501 to the main turbine 530. In some embodiments, the vaporized second fluid 501 reenters the combustion chamber 130 within a superheater to be superheated. In some embodiments, the vaporized first fluid 101 from the second tower outlet 122 may reenter the combustion chamber within a superheater to be superheated. In embodiments in which the second fluid 501 comprises water, steam may be superheated to more than 390° C. to ensure that there is no water entrained in the steam (i.e., to ensure that there is no liquid second fluid 501 in the vaporized second fluid 501). Design parameters will vary depending on the second fluid 501, the first fluid 101, and the main turbine 530.

In some embodiments (not shown), a pump regulates the flow of the second fluid 501 through the second fluid circulating loop 500, and thus the flow of the second fluid 501 through the main turbine 530. Such a design allows for increased flexibility of location for the components of the second fluid circulating loop 500. For example, the second fluid reservoir 510 may be proximate to the first fluid reservoir 210. It will be appreciated that embodiments utilizing a pump generally require the use of electricity and/or manual labor.

In an open system, steam generated in the combustion chamber 130 can be directed to flow out of the tower 110 through the second tower outlet 122 through the path 432, mixes with the vaporized second fluid 501, and then passes through the main turbine 530. In alternative embodiments, the steam and vaporized second fluid 501 mix within the main turbine 530 or after passing through separate turbines. The steam is at least partially condensed in the condenser 540. In certain embodiments, the condensed steam and condensed second fluid 501 are directed to flow into the second fluid reservoir 510. In some embodiments, the condensed steam is absorbed by the second fluid 501 (e.g., when the second fluid 501 comprises water) while in other embodiments, the second fluid 501 is immiscible with water. The immiscible fluids may be separated within the second fluid reservoir 510 (e.g., as depicted in FIG. 2) or prior to the second fluid reservoir 510. Immiscible fluids 101, 501 may produce a top surface 514 of the second fluid 501 and a top surface 532 of the first fluid 101. The top surface 514 may also be the dynamic boundary between the first fluid 101 and the second fluid 501. The condensed steam may be utilized similar to the steam exiting the condenser 440 as described above, for example by being joined with the outlet of the condenser 440. In such an embodiment, the second fluid reservoir outlet 516 is preferably positioned within the second fluid reservoir 510 such that the second fluid 501 is not directed into the tower 110, for example above a boundary 514 between the water and the second fluid 501 when the second fluid 501 is denser than water. It will be appreciated that care should be taken to prevent contamination of the tower 110 with the second fluid 501, for example by including a filter, u-tube, or other such device.

Heat generated by the reaction in the combustion chamber 130 may vaporize at least some of the first fluid 101. The interior of the tower 110 may be adapted to condense the vaporized first fluid 101, for example as a result of thermal communication with the heat exchanger 520. In alternative embodiments, the vaporized first fluid 101 is directed out of the tower 110 through the second tower outlet 122 or a different tower outlet and may be used similarly to the steam generated by the reaction, as described above. In a preferred embodiment, the first fluid 101 comprises pure water such that it is undistinguishable if mixed with the generated steam. In certain open system embodiments, the first fluid 101 comprises substantially the same fluid as the second fluid 501, allowing for a simpler design of the second fluid circulating loop 500. However, the use of different fluids for the first fluid 101 and the second fluid 501 allows for greater system flexibility. For example, the second fluid 501 may be adapted to readily vaporize while the first fluid 101 is adapted to absorb a modicum of heat.

FIG. 2 further illustrates an embodiment in which the system 20 generates electricity by passing generated steam and/or vaporized first fluid 101 through a main turbine 430 in fluid communication with the second tower outlet 122. Rather than, or in addition to, using the heat exchanger 520 to vaporize the second fluid 501, the heat generated by the reaction is used to create steam (e.g., superheated steam) and/or vaporized first fluid 101 (e.g., superheated vaporized first fluid 101). After flowing through the main turbine 430, the steam and/or first fluid 101 are condensed in the condenser 440 or used for other purposes as described above. The condensed steam and/or first fluid 101 may be directed by a valve 450 as described above, for example as a water source via outlet 460, to provide water to the first fluid column 134 via tower inlet 124, or to provide water to the first fluid reservoir 210 via outlet 470. Return of the condensed first fluid 101 to the tower 110, for example by flowing additional first fluid 101 into the tower 110 through the first tower outlet 120 or the first fluid inlet 124, is preferred when vaporization of the first fluid 101 requires replenishment of the first fluid 101 within the tower 110.

It will be appreciated that electricity is not immediately generated in the main turbine 530 because the main turbine 530 requires vaporized second fluid 501 and/or steam from the second tower outlet 122. Generally, the second fluid 501 is not vaporized and steam is not generated in the combustion chamber 130 until the tower 110 has been in use (i.e., having a reaction in a combustion chamber 130) for some duration. Thus, it is desirable to have alternative clean sources of electricity generation during this initial start-up duration.

In certain embodiments, at least one of the turbines 222, 314, 324 depicted in FIG. 2 provides such initial start-up electricity. The turbine 314 is in fluid communication with the oxygen source 310 and is configured such that a flow of oxygen directed through the turbine 314 causes the turbine 314 to generate electricity. The turbine 324 is in fluid communication with the combustible fuel source 320 and is configured such that a flow of the combustible fuel directed through the turbine 324 causes the turbine 324 to generate electricity. The turbines 314, 324 are preferably gas turbines. In some embodiments, the turbines 314, 324 are positioned within the tower 110. The turbine 222 is in fluid communication with the first tower outlet 120 and is configured to generate electricity when the flow of the first fluid 101 is directed out of the tower 110 through the first tower outlet 120, for example when the first tower outlet valve 220 is opened while the tower 110 is completely full of the first fluid 101. The turbine 222 preferably comprises a liquid turbine (e.g., a water turbine). In embodiments utilizing the turbine 222, the first reservoir inlet 240 is preferably lower in elevation than the first tower outlet 120, such that fluid flowing from the tower 110 to the first fluid reservoir 210 flows down.

The systems described herein may advantageously be small compared to current electricity generating facilities. The combustion of pure hydrogen with oxygen is among the most exothermic non-nuclear reactions known. As such, the size of the system 10, 20, or the system "footprint," may be advantageously small. For example, the energy produced by the combustion of one mole of hydrogen gas generates enough energy to raise the temperature of 0.03 gallons (0.011

L) of water from 77° F. (25° C.) to 212° F. (100° C.) and then to vaporize all 0.03 gal (0.011 L). A room-temperature 2-liter canister at a pressure of 250 pounds per square inch (1,724 kPa) may contain, for example, about 2 moles of hydrogen gas. Hydrogen canisters may be designed to hold up to 10,000 psi (68,946 kPa) such that a room-temperature 2-liter canister could contain about 80 moles of hydrogen gas. Much larger canisters, for example 30 liters, can contain 2,400 moles of hydrogen gas at room temperature and 10,000 psi (68,946 kPa), which, when combined with oxygen in the systems described herein, may create enough energy to heat from room temperature and evaporate 70 gal (264 L) of water. Alternatively, a portion of the energy may be used to create superheated vaporized first fluid 101 (e.g., superheated steam). Although the energy has been described herein in terms heating water, it will be appreciated that the steam may be flowed through a steam turbine to generate an appropriate amount of electricity.

Another aspect of the current invention is the recognition that such a system can exploit the storability of energy in chemical form. Conventional energy storage media, for example, batteries, cannot contain as much electricity as the potential energy that may be generated by the reaction of a combustible fuel, such as hydrogen gas, with oxygen. The systems described herein may advantageously take energy from one source, for example, a nuclear reactor in a remote region, and transfer it with high efficiency to a potential energy source which can be located in another location, for example, an office building in a dense urban area. The chemical energy may be stored in tanks or hard-piped, similar to natural gas. Additionally, storing and transporting energy in the form of oxygen and combustible fuel can be more efficient than typical energy storage and transport. For example, electricity transported long distances may cause losses of about 10% due to heat and noise.

In addition to producing electricity and minimal impurities, the systems described herein may advantageously raise capital for users. For example, the stock of firms using clean electricity sources typically trades about 15% higher than the stock of similar firms using conventional electricity sources. Despite such data, many companies have not switched to clean electricity sources for reasons such as the lack of certainty described above. By contrast, electricity generating systems comprising a dynamic combustion chamber (or "barometric combustion chamber") provide certainty as well as cleanliness.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while several variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A method of generating electricity while producing minimal impurities, the method comprising:
   obtaining hydrogen produced at least in part from either an uncertain power source or a pollution producing power source, the power source at a first location;
   directing oxygen and the hydrogen into a combustion chamber at a second location, the combustion chamber substantially free of nitrogen and at a pressure less than an ambient pressure outside and proximate to the combustion chamber;
   igniting a reaction between the oxygen and the hydrogen within the combustion chamber, thereby generating heat and steam; and
   utilizing at least one of the heat and the steam to generate electricity at the second location.

2. The method of claim 1, wherein the pollution producing power source comprises a coal, oil, or natural gas power plant.

3. The method of claim 1, wherein the pollution producing power source comprises a nuclear power plant.

4. The method of claim 1, wherein the uncertain power source comprises a solar, wind, or wave power plant.

5. The method of claim 1, wherein the first location is remote from the second location.

6. The method of claim 1, wherein the hydrogen is stored in a tank.

7. The method of claim 1, wherein the hydrogen is transported to the second location along a pipeline.

8. The method of claim 1, wherein utilizing at least one of the heat and the steam to generate electricity comprises directing steam through a turbine.

9. The method of claim 1, wherein utilizing at least one of the heat and the steam to generate electricity comprises:
   at least partially vaporizing a fluid in a heat exchanger in thermal communication with the combustion chamber; and
   directing the vaporized fluid through a turbine.

10. A method of generating heat from an exothermic reaction of oxygen with a combustible fuel, the reaction products comprising minimal impurities, the method comprising:
    providing a combustion chamber substantially free of nitrogen and at a pressure less than an ambient pressure outside and proximate to the combustion chamber;
    directing a flow of oxygen into the chamber through an oxygen inlet in fluid communication with the combustion chamber;
    directing a flow of the combustible fuel into the chamber through a fuel inlet in fluid communication with the combustion chamber; and
    igniting the reaction between the oxygen and the combustible fuel, thereby generating heat.

11. The method of claim 10, wherein the step of generating heat comprises generating a quantity of heat sufficiently to at least partially vaporize a fluid in a heat exchanger in thermal communication with the combustion chamber, and the method further comprising directing the vaporized fluid through a turbine.

12. The method of claim 11, wherein directing the vaporized fluid through a turbine comprises generating electricity.

13. The method of claim 10, wherein the combustible fuel comprises hydrogen and wherein the reaction products comprise $H_2O$.

14. The method of claim 13, wherein at least some of the $H_2O$ produced in the reaction comprises steam.

15. The method of claim 14, further comprising directing the steam through a turbine.

16. The method of claim 10, wherein the combustion chamber is defined by the enclosed end of a tower and the top surface of a fluid contained in the tower.

17. The method of claim 16, wherein the fluid comprises water and wherein at least some of the heat generated by the reaction at least partially vaporizes the water, thereby generating steam.

18. The method of claim 17, further comprising directing the steam through a turbine.

19. The method of claim 18, wherein directing the steam through the turbine comprises generating electricity.

20. A method of creating a dynamic combustion chamber substantially free of nitrogen and at a pressure less than an ambient pressure outside and proximate to the chamber, the chamber adapted to house a combustion reaction between oxygen and a fuel comprising hydrogen that produces heat and reduced impurities, the method comprising:
   providing a sealable vertically-oriented tower comprising combustion reactant inlets deliverable to an enclosed top end of the tower, the tower height being greater than the ratio of the ambient pressure to the density of a fluid adapted to absorb the reaction products;
   completely filling the tower with the fluid; and
   opening an outlet proximate to the bottom of the tower and in fluid communication with the tower so as to allow the fluid to flow out of the tower, thereby creating the dynamic combustion chamber defined by the enclosed top end of the tower and the top surface of the fluid remaining in the tower.

\* \* \* \* \*